United States Patent
Morimitsu et al.

(10) Patent No.: US 8,629,230 B2
(45) Date of Patent: Jan. 14, 2014

(54) METHOD FOR MANUFACTURING CARBOXYL GROUP-CONTAINING WATER-SOLUBLE POLYMER

(75) Inventors: Yuichiro Morimitsu, Himeji (JP); Masayuki Toda, Tokyo (JP); Taro Ashida, Himeji (JP); Masatoyo Yoshinaka, Tokyo (JP); Shinji Kobayashi, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 52 days.

(21) Appl. No.: 13/383,339

(22) PCT Filed: Jul. 27, 2010

(86) PCT No.: PCT/JP2010/062579
§ 371 (c)(1),
(2), (4) Date: Jan. 10, 2012

(87) PCT Pub. No.: WO2011/016364
PCT Pub. Date: Feb. 10, 2011

(65) Prior Publication Data
US 2012/0108776 A1 May 3, 2012

(30) Foreign Application Priority Data
Aug. 4, 2009 (JP) ................................. 2009-181829

(51) Int. Cl.
*C08F 220/06* (2006.01)
*C08F 220/10* (2006.01)
*C08F 216/12* (2006.01)
*C08F 2/06* (2006.01)

(52) U.S. Cl.
USPC ..................................... 526/329.6; 526/318.5

(58) Field of Classification Search
USPC ........... 561/80, 81, 91, 317.1; 526/80, 81, 91, 526/317.1, 318.5, 329.6
See application file for complete search history.

(56) References Cited

U.S. PATENT DOCUMENTS

| | | | |
|---|---|---|---|
| 3,948,867 A * | 4/1976 | Bader et al. | ..................... 526/79 |
| 5,663,253 A | 9/1997 | Russo et al. | |
| 2005/0159571 A1 | 7/2005 | Hamamoto et al. | |

FOREIGN PATENT DOCUMENTS

| | | |
|---|---|---|
| JP | 1-217017 A | 8/1989 |
| JP | 2-22312 A | 1/1990 |
| JP | 2-258813 A | 10/1990 |
| JP | 6-107720 A | 4/1994 |
| JP | 2002-97205 A | 4/2002 |
| JP | 2003-268009 A | 9/2003 |
| JP | 2005-126445 A | 5/2005 |
| JP | 2007-246917 A | 9/2007 |

OTHER PUBLICATIONS

International Search Report for PCT/JP2010/062579, mailed on Aug. 24, 2010.
Database WPI Week 200252, Thomson Scientific, London, GB; AN 2002-463077 XP002687277 & JP 2002-097205 A (Nippon Junyaku KK) Apr. 2, 2002 (Abstract).
Database WPI Week 200803, Thomson Scientific, London: GB; AN 2008-A39320 XP002687278 & JP 2007-24897 A (Nippon Shokubai Co Ltd) Sep. 27, 2007 (Abstract).
Extended European Search Report issued Nov. 27, 2012, in European Patent Application No. 10806363.7.
International Preliminary Report on Patentability issued Mar. 13, 2012, in PCT International Application No. PCT/JP2010/062579.

* cited by examiner

*Primary Examiner* — Vu A Nguyen
(74) *Attorney, Agent, or Firm* — Birch, Stewart, Kolasch & Birch, LLP

(57) ABSTRACT

In manufacturing of a carboxyl group-containing water-soluble polymer by a precipitation polymerization method, a method which can improve production efficiency with increasing practicality continuously adds a monomer solution wherein a monomer component containing an $\alpha,\beta$-unsaturated carboxylic acid is dissolved in an inert solvent in a concentration of 20 to 50% by volume to an inert solvent charged in a reaction vessel. In this case, the amount of the inert solvent charged in the reaction vessel is set so that the concentration of the monomer component in the total amount summed up with the monomer solution is 10 to 24% by volume, and the time period until completion of continuous addition of the total amount of the monomer solution is set so that the conversion of the monomer component at the time of completion of addition of the total amount of the monomer solution is 60% or more. The monomer component may contain a polymerizable compound having two or more ethylenically unsaturated groups.

7 Claims, No Drawings

METHOD FOR MANUFACTURING CARBOXYL GROUP-CONTAINING WATER-SOLUBLE POLYMER

TECHNICAL FIELD

The present invention relates to a method for manufacturing a carboxyl group-containing water-soluble polymer, in particular, a method for manufacturing a carboxyl group-containing water-soluble polymer by carrying out a reaction of a monomer component containing an $\alpha,\beta$-unsaturated carboxylic acid in an inert solvent.

BACKGROUND ART

A carboxyl group-containing water-soluble polymer is generally manufactured by carrying out precipitation polymerization in an inert solvent in which a monomer component containing an $\alpha,\beta$-unsaturated carboxylic acid and optionally a polymerizable compound having two or more ethylenically unsaturated groups is dissolved but in which a carboxyl group-containing water-soluble polymer produced by polymerization of the monomer component is not dissolved. Precipitation polymerization refers to a polymerization method wherein a polymer produced by a polymerization reaction is precipitated out of a solvent by using an inert solvent as described above, by which polymerization method a carboxyl group-containing water-soluble polymer can be obtained in a form of a powder.

In a general manufacturing of a carboxyl group-containing water-soluble polymer by precipitation polymerization, a polymerization reaction is progressed by dissolving a required monomer component in an inert solvent charged in a reaction vessel, and heating the reaction system in the presence of a radical polymerization initiator (for example, see Patent Literatures 1, 2, 3, 4 and 5). However, since this method tends to result in very high viscosity of a reaction solution slurry formed with the progress of the polymerization reaction, it is difficult during the polymerization reaction to control heat of reaction, and there is a risk of causing bumping of a reaction solution and a possibility of having an adverse effect on the degree of polymerization or physical properties of a produced polymer. In particular, when the concentration of a monomer component in the reaction system exceeds 10% by volume, this tendency is remarkable.

Thus, in manufacturing of a carboxyl group-containing water-soluble polymer by general precipitation polymerization as described above, although increase in viscosity of a reaction solution slurry is suppressed by reducing the concentration of a monomer component in an inert solvent to cope with the above-mentioned defect, it is difficult to increase production efficiency of a carboxyl group-containing water-soluble polymer due to decrease in the amount of production per batch.

As other methods, for manufacturing a carboxyl group-containing water-soluble polymer, Patent Literatures 6 and describe methods of carrying out a reaction by additionally adding a monomer component to a reaction solution in which a specific amount of a monomer component remains unreacted. In addition, Patent Literature 8 (in particular, claims and paragraph 0032) describes a method of dividedly adding a monomer component to an inert solvent in 2 to 8 additions and a method of continuously adding a monomer component little by little to an inert solvent.

However, methods of additionally adding or dividedly adding a monomer component lack practicality since an effect of suppressing increase in viscosity of a reaction solution slurry is insufficient despite complication in control and operation. In addition, there is a tendency that the produced carboxyl group-containing water-soluble polymer becomes light and small in the bulk specific gravity. Furthermore, a method of continuously adding a monomer component lacks practicality since the optimal range of reaction conditions such as polymerization temperature is limited and thus the control is difficult as described in Patent Literature 8.

PRIOR ART LITERATURES

Patent Literatures

Patent Literature 1: Japanese Patent Application Laid-Open No. 1-217017
Patent Literature 2: Japanese Patent Application Laid-Open No. 2-22312
Patent Literature 3: Japanese Patent Application Laid-Open No. 2-258813
Patent Literature 4: Japanese Patent Application Laid-Open No. 6-107720
Patent Literature 5: U.S. Pat. No. 5,663,253
Patent Literature 6: Japanese Patent Application Laid-Open No. 2003-268009
Patent Literature 7: Japanese Patent Application Laid-Open No. 2005-126445
Patent Literature 8: Japanese Patent Application Laid-Open No. 2002-097205

DISCLOSURE OF THE INVENTION

Problems to be Solved by the Invention

An object of the present invention is to enhance practicality and to improve production efficiency in manufacturing of a carboxyl group-containing water-soluble polymer by a precipitation polymerization method.

Means for Solving the Problems

The inventors focused on a method of carrying out a polymerization reaction with continuously adding an inert solvent solution of a monomer component to an inert solvent in manufacturing of a carboxyl group-containing water-soluble polymer by a precipitation polymerization method. Also, the inventors found that, in this method, when the concentration of the monomer component in the inert solvent solution, the concentration of the monomer component relative to the total amount of inert solvent to be used and the conversion of the monomer component in the polymerization reaction system after completion of addition of the total amount of the inert solvent solution are controlled, increase in viscosity of a reaction solution slurry can be easily suppressed, whereby production efficiency of a carboxyl group-containing water-soluble polymer increases.

The present invention relates to a method for manufacturing a carboxyl group-containing water-soluble polymer by carrying out a reaction of a monomer component containing an $\alpha,\beta$-unsaturated carboxylic acid in an inert solvent. This method comprises step (A) of preparing a reaction vessel in which an inert solvent is charged and step (B) of continuously adding a monomer solution wherein the monomer component is dissolved in an inert solvent at a concentration of 20 to 50% by volume to the inert solvent charged in the reaction vessel. Here, the amount of the inert solvent charged in the reaction vessel in step (A) is set so that the concentration of the monomer component in the total amount summed up with the monomer solution is 10 to 24% by volume. In addition, the time period until completion of continuous addition of the total amount of the monomer solution in step (B) is set so that the conversion of the monomer component is 60% or more at the time of completion of addition of the total amount of the monomer solution.

In this manufacturing method, upon carrying out precipitation polymerization with continuously adding an inert solvent solution of a specified monomer component to an inert solvent, since the concentration of the monomer component in the inert solvent solution, the concentration of the monomer component relative to the total amount of the inert solvent to be used and the conversion of the monomer component in the polymerization reaction system after completion of addition of the total amount of the inert solvent solution are controlled, increase in viscosity of a reaction solution slurry can be easily suppressed, and production efficiency of a carboxyl group-containing water-soluble polymer can be increased.

The manufacturing method of the present invention generally further comprises step (C) of continuing the reaction after completion of the continuous addition of the total amount of the monomer solution. In this case, the manufacturing method of the present invention usually further comprises step (D) of volatilizing the inert solvent from the reaction solution after completion of the reaction in step (C), to remove the inert solvent.

The α,β-unsaturated carboxylic acid used in the manufacturing method of the present invention is, for example, at least one kind selected from the group consisting of acrylic acid; methacrylic acid; an ester of acrylic acid and a higher alcohol of which alkyl group has a carbon number of 10 to 30; and an ester of methacrylic acid and a higher alcohol of which alkyl group has a carbon number of 10 to 30.

In addition, the monomer component may further comprise, for example, a polymerizable compound having two or more ethylenically unsaturated groups. The polymerizable compound having two or more ethylenically unsaturated groups is, for example, at least one kind selected from the group consisting of pentaerythritol allyl ether, polyallyl saccharose, diethylene glycol diallyl ether and polyethylene glycol diallyl ether.

The inert solvent charged in a reaction solution and the inert solvent in which a monomer component is dissolved in the monomer solution used in the manufacturing method of the present invention are generally the same.

In the manufacturing method of the present invention, less than 50% by weight of the total amount of the monomer component can be previously dissolved in the inert solvent to be charged in the reaction vessel in step (A).

As employed herein, the terms "carboxyl group" in the "carboxyl group-containing water-soluble polymer" and "carboxylic acid" in the "α,β-unsaturated carboxylic acid" also encompass, respectively, "carboxylate ester group" and "carboxylate ester."

Other objects and effects of the present invention will be mentioned in the following detailed description.

EMBODIMENTS OF THE INVENTION

In the method for manufacturing a carboxyl group-containing water-soluble polymer according to the present invention, a monomer component containing an α,β-unsaturated carboxylic acid is subjected to a polymerization reaction in an inert solvent.

The α,β-unsaturated carboxylic acid used herein is not limited specifically, but includes, for example, an α,β-unsaturated carboxylic acid such as acrylic acid, methacrylic acid, crotonic acid, maleic acid, itaconic acid and fumaric acid; alkyl acrylate ester; and alkyl methacrylate ester. These α,β-unsaturated carboxylic acids may be used alone respectively or two or more kinds of the α,β-unsaturated carboxylic acids may be used in combination.

Alkyl acrylate ester and alkyl methacrylate ester refer to alkyl esters of acrylic and methacrylic acid and alkyl alcohol, preferably a higher alcohol of which alkyl group has a carbon number of 10 to 30, respectively. The higher alcohol of which alkyl group has a carbon number of 10 to 30 forming this alkyl ester includes, for example, decanol, lauryl alcohol, myristyl alcohol, cetyl alcohol, stearyl alcohol, eicosanol, behenyl alcohol and tetracosanol. Especially, as this alkyl ester, those of which alkyl group has a carbon number of 18 to 24, for example, stearyl acrylate, stearyl methacrylate, eicosanyl acrylate, eicosanyl methacrylate, behenyl acrylate, behenyl methacrylate, tetracosanyl acrylate and tetracosanyl methacrylate and a mixture thereof are preferably used, since these alkyl esters can be obtained inexpensively and easily.

The above-mentioned alkyl ester of acrylic acid or methacrylic acid can be appropriately prepared and used, however a commercially available product thereof may be also used. For example, a mixture of stearyl methacrylate, eicosanyl methacrylate, behenyl methacrylate and tetracosanyl methacrylate is commercially available from NOF Corporation under the trade name of "BLEMMER VMA70".

Here, among the α,β-unsaturated carboxylic acids, especially preferable α,β-unsaturated carboxylic acid is a mixture of one kind or two or more kinds selected from acrylic acid, methacrylic acid, an ester of acrylic acid and a higher alcohol of which alkyl group has a carbon number of 10 to 30 (especially an ester of acrylic acid and a higher alcohol of which alkyl group has a carbon number of 12 to 24) and an ester of methacrylic acid and a higher alcohol of which alkyl group has a carbon number of 10 to (especially an ester of methacrylic acid and a higher alcohol of which alkyl group has a carbon number of 12 to 24), since a carboxyl group-containing water-soluble polymer having excellent solubility to water and transparency can be obtained.

When a monomer component which does not contain a polymerizable compound having two or more ethylenically unsaturated groups described below is used as a monomer component, it is especially preferable that acrylic acid and the above-mentioned alkyl methacrylate ester are concomitantly used as an α,β-unsaturated carboxylic acid.

The monomer component may further contain a polymerizable compound having two or more ethylenically unsaturated groups. A carboxyl group-containing water-soluble polymer obtained by using this monomer component can function as a thickener, when added to water or a variety of aqueous solutions. The polymerizable compound having two or more ethylenically unsaturated groups used herein is not limited specifically, but, in general, is preferably a compound having an allyl group as an ethylenically unsaturated group, and can include, for example, pentaerythritol allyl ether, diethylene glycol diallyl ether, polyethylene glycol diallyl ether and polyallyl saccharose. The compound having two or more ethylenic unsaturated groups may be used alone respectively, or two or more kinds of the compounds may be used in combination.

In the monomer component, the usage of the compound having two or more ethylenically unsaturated groups is generally preferably set at 2 parts by weight or less, and more preferably set at 1.5 parts by weight or less, relative to 100 parts by weight of α,β-unsaturated carboxylic acid. When the usage of the compound having two or more ethylenically unsaturated groups exceeds 2 parts, there is a possibility that a water-insoluble polymer easily comes to be mixed in the obtained carboxyl group-containing water-soluble polymer.

As the inert solvent used upon subjecting the monomer component to a polymerization reaction, a wide variety of inert solvents can be used, so long as the monomer component dissolves in the solvent, but the obtained carboxyl group-containing water-soluble polymer does not dissolves in the solvent, which solvent does not inhibit the polymerization reaction of the monomer component. As specific examples, an aliphatic hydrocarbon solvent such as n-pentane, n-hexane, n-heptane, cyclopentane and cyclohexane; an aromatic hydrocarbon solvent such as benzene and toluene; a halogenated solvent such as 1,2-dichloroethane and methylene chloride; and an ester solvent such as ethyl acetate and butyl acetate. These inert solvents may be used alone respectively, or two kinds of the inert solvents may be used in combination.

In polymerization of a monomer component, first, a reaction vessel in which an inert solvent is charged is prepared (step (A)). Here, in general, a radical polymerization initiator is added to the inert solvent. As a radical polymerization initiator, a wide variety of known radical polymerization initiators, for example, α,α'-azobisisobutyronitrile, 2,2'-azobis-2,4-dimethylvaleronitrile and 2,2'-azobismethylisobutyrate, and the like can be used.

The usage of the radical polymerization initiator is preferably set at 0.0001 to 0.0015 mol relative to 1 mol of α,β-unsaturated carboxylic acid contained in a monomer component. When the usage is less than 0.0001 mol, the reaction rate becomes slow, and there is a tendency that the obtained carboxyl group-containing water-soluble polymer becomes light and small in the bulk specific gravity. On the contrary, when the usage of the polymerization initiator exceeds 0.0015 mol, there is a possibility that polymerization progresses rapidly and the reaction becomes difficult to control.

Next, to the inert solvent charged in the reaction vessel, a solution of a monomer component is slowly, continuously added (step (B)). The solution of a monomer component continuously added herein (hereinafter sometimes referred to as a monomer solution) is prepared by dissolving a monomer component in an inert solvent. The inert solvent used in the monomer solution is similar to the inert solvent charged in the reaction vessel in step (A). In general, an inert solvent which is the same as the inert solvent charged in the reaction vessel is used, but a different solvent may be used so long as the solvent has compatibility with the inert solvent.

In the manufacturing method of the present invention, the concentration of the monomer component in the monomer solution is set at 20 to 50% by volume. However, this concentration is more preferably set at 24 to 45% by volume, and even more preferably set at 28 to 40% by volume. When the concentration of the monomer component is less than 20% by volume, there is a tendency that a viscosity of a reaction solution slurry becomes high and heat of reaction becomes difficult to control in polymerization of the monomer component, and there is a possibility of causing bumping of a reaction solution. In addition, the produced carboxyl group-containing water-soluble polymer tends to adhere to an inner wall or an impeller of the reaction vessel, because the carboxyl group-containing water-soluble polymer aggregates and becomes more likely to form a mass. Thus, there is a possibility that it becomes difficult to obtain a carboxyl group-containing water-soluble polymer in a form of a powder or physical properties of the carboxyl group-containing water-soluble polymer are adversely affected. On the contrary, when the concentration of the monomer component exceeds 50% by volume, in addition to the possibility that the defects similar to the defects in the case where the concentration is less than 20% by volume likely to cause, there is a possibility that a water-insoluble polymer (a highly cross-linked product of carboxyl group-containing water-soluble polymers) is produced as a byproduct in the obtained carboxyl group-containing water-soluble polymers. Here, a water-insoluble polymer is generally separated as a dandruff-like white particle in the case where the produced carboxyl group-containing water-soluble polymer is dispersed in ion-exchanged water and left standing whole day and night, thereafter the dispersion is subjected to suction filtration with a mesh having an aperture of 50 microns.

When a monomer solution is continuously added to the inert solvent in the reaction vessel, it is generally preferable that the inside of the reaction vessel is set under an atmosphere of inert gas such as nitrogen gas, argon gas or the like. In addition, upon continuous addition of the monomer solution, it is preferable that the content in the reaction vessel is stirred and the reaction temperature is set at 50 to 95° C., and preferably at 65 to 90° C. by appropriately heating or cooling the reaction vessel. Here, when continuous addition of the monomer solution is started, the inert solvent in the reaction vessel may be at room temperature of around 20 to 30° C. or may be heated to near the above-mentioned reaction temperature.

When the reaction temperature is less than 50° C., a viscosity of a reaction solution slurry increases, and there is a possibility that it becomes difficult to uniformly stir the reaction system. On the contrary, when the reaction temperature exceeds 90° C., the produced carboxyl group-containing water-soluble polymer tends to adhere to an inner wall or an impeller of the reaction vessel, because the produced carboxyl group-containing water-soluble polymer aggregates and becomes more likely to form a mass. Thus, there is a tendency that it becomes difficult to obtain a carboxyl group-containing water-soluble polymer in a form of a powder.

The continuous addition of the monomer solution to the inert solvent in the reaction vessel can be carried out by a wide variety of methods, so long as the monomer solution can be divided infinitely and added little by little at an almost constant speed, whether the method is a manual method or a method using a device. However, in the present invention, it is generally preferable that an addition device is used, since the time period for continuous addition is set to be comparatively long as described below. As a device for addition, a tube pump or the like can be used in the case of small-scale manufacturing, and a slurry pump or the like can be used in the case of industrial-scale manufacturing.

The manufacturing method of the present invention is set to meet the following conditions in the above-mentioned steps (A) and (B).

(Condition 1)

The amount of the inert solvent to be charged in the reaction vessel in step (A) is set so that the concentration of a monomer component in the total amount summed up with the total amount of the monomer solution to be continuously added in step (B) is 10 to 24% by volume, preferably 12 to 22% by volume, and more preferably 14 to 20% by volume. When this concentration is less than 10% by volume, there is a possibility that the production amount per batch becomes small and the method becomes uneconomical. On the contrary, when the concentration exceeds 24% by volume, there is a possibility of causing bumping of the reaction solution, since a viscosity of the reaction solution slurry becomes high and it becomes difficult to control the heat of reaction. In addition, the produced carboxyl group-containing water-soluble polymer tends to adhere to an inner wall or an impeller of the reaction vessel, and there is a possibility that it becomes difficult to obtain a carboxyl group-containing water-soluble polymer in a form of a powder, or the physical properties of the obtained carboxyl group-containing water-soluble polymer is adversely affected, because the produced carboxyl group-containing water-soluble polymer aggregates and becomes more likely to form a mass.

(Condition 2)

The time period until continuous addition of the total amount of the monomer solution is completed in step (B) is set so that the conversion of the monomer component is 60% or more at the time of completion of addition of the total amount of the monomer solution. This time period is variable, since it changes depending on a wide variety of factors such as composition of the monomer solution, the amount of a radical polymerization initiator to be used, and reaction temperature. However, in general, when the time period until the continuous addition is completed is set to be long, the above-mentioned conversion can be accomplished. Here, the conversion of the monomer component can be derived according to the following formula.

[Formula 1]

$$\text{Conversion of monomer component (\%)} = \frac{\text{Total amount of monomer component added to reaction system} - \text{Amount of unreacted monomer component}}{\text{Total amount of monomer component added to reaction system}} \times 100$$

In the formula, the amount of the unreacted monomer component means the amount of the unreacted α,β-unsaturated carboxylic acid. In addition, in the formula, each amount of the monomer component is based on weight.

This conversion can be confirmed by a method using liquid chromatography such as high performance liquid chromatography.

When the conversion of the monomer component at the time of completion of addition of the total amount of the monomer solution is less than 60% by volume, there is a possibility of causing bumping of the reaction solution, since a viscosity of the reaction solution slurry becomes high and it becomes difficult to control the heat of reaction during the following polymerization of the monomer component. In addition, the produced carboxyl group-containing water-soluble polymer tends to adhere to an inner wall or an impeller of the reaction vessel, and there is a possibility that it becomes difficult to obtain the carboxyl group-containing water-soluble polymer in a form of a powder or the physical properties of the carboxyl group-containing water-soluble polymer is adversely affected, since the produced carboxyl group-containing water-soluble polymer aggregates and becomes more likely to form a mass.

While it is necessary that the time period from start to completion of the continuous addition of the monomer solution is set so that condition 2 is accomplished, it is generally preferable that the time period is set to be 60 to 360 minutes. When this time period is short (that is to say, when addition rate of the monomer solution is high), there is a tendency that the reaction is inhibited until the concentration of a monomer component becomes a certain level or more due to dilution effect on the reaction solution by the added monomer solution, and the reaction becomes difficult. However, since the reaction starts to progress rapidly when the concentration of the monomer component becomes a certain level or more, control of the reaction by heat removal from the reaction system becomes difficult, and the reaction becomes dangerous. In addition, there is a tendency that the produced carboxyl group-containing water-soluble polymer becomes light and the bulk specific gravity described below becomes small. On the contrary, when the time period is too long, productivity of the carboxyl group-containing water-soluble polymer decreases and the method becomes uneconomical.

After completion of addition of the whole amount of the monomer solution, the reaction in the reaction vessel is kept (step (C)). This reaction time changes depending on a wide variety of factors such as reaction temperature, the amount of the radical polymerization initiator used and a 10 hour half-life temperature of the radical polymerization initiator, but it is generally preferable that the reaction time is set to be 1 to 8 hours.

After completion of the reaction, the inert solvent is volatilized and removed by heating the reaction solution (step (D)). With this step, a carboxyl group-containing water-soluble polymer in a form of a fine powder can be obtained. In this case, when the heating temperature of the reaction solution is too high, there is a possibility that solubility of the carboxyl group-containing water-soluble polymer to water is impaired. On the other hand, when the heating temperature of the reaction solution is low, removal of the inert solvent takes a long time and production efficiency is decreased. Thus, it is generally preferable that the heating temperature of the reaction solution for removing the inert solvent is set within the range of 80° C. or more and 120° C. or less.

In the manufacturing method of the present invention, the balance between polymerization kinetics of the monomer component and the addition rate of a monomer solution can be kept by accomplishing the above-mentioned wide variety of conditions which can be easily set, and, as a result, slurry concentration (concentration of a monomer component) in the reaction system can be increased with suppressing increase in the viscosity of the reaction solution slurry. Therefore, the manufacturing method of the present invention is highly practical due to ease in control of reaction, especially in control of the reaction temperature, and can safely manufacture a carboxyl group-containing water-soluble polymer with increasing production efficiency per batch. In addition, the carboxyl group-containing water-soluble polymer produced by the manufacturing method of the present invention hardly adheres to an inner wall or an impeller of the reaction vessel as an aggregate, and easily precipitates as a stable fine particle in the reaction solution. It is estimated that these results by the manufacturing method of the present invention are due to the reasons that: since a monomer solution is continuously added, the concentration of the monomer component in the reaction system can be kept at relatively low concentration; the monomer solution continuously added can function as a diluent of the reaction liquid slurry; and a part of the monomer component continuously added is absorbed by the carboxyl group-containing water-soluble polymer which is previously produced in the reaction system, and polymerized; and the like.

The carboxyl group-containing water-soluble polymer produced by the manufacturing method of the present invention has a bulk specific gravity of 0.20 g/ml or more and within the range of 0.27 g/ml or less, within which range solubility to water is hardly impaired. Thus, the carboxyl group-containing water-soluble polymer produced by the manufacturing method of the present invention is different in heaviness from a light carboxyl group-containing water-soluble polymer obtained by a conventional precipitation polymerization method, of which bulk specific gravity is less than 0.20 g/ml. Therefore, this carboxyl group-containing water-soluble polymer can decrease a transportation cost and a space for storage.

In the manufacturing method of the present invention, a part of a monomer component may be previously dissolved in an inert solvent to be charged in a reaction vessel in step (A). In this case, the amount of the monomer component previously dissolved is set at preferably less than 50% by weight, and more preferably less than 30% by weight relative to the total amount of the monomer component used for the manufacturing of a carboxyl group-containing water-soluble polymer. When the amount is 50% by weight or more, since a viscosity of the reaction solution slurry becomes too high and sufficient stirring of the reaction solution becomes difficult, there is a possibility of causing bumping due to partial overheating of the reaction solution. In addition, since there is a tendency that the produced carboxyl group-containing water-soluble polymer becomes more likely to aggregate and adhere to an inner wall or an impeller of the reaction vessel, there is a possibility that it becomes difficult to stably obtain a carboxyl group-containing water-soluble polymer in a form of a powder.

EXAMPLES

Example 1

A reaction vessel consisting of a 500 mL-volume round-bottom separable flask (spherical diameter: 110 mm)

equipped with a stirrer, a thermometer, a nitrogen-blowing tube, an addition device and a condenser was prepared. The stirrer used here was equipped with 4-paddle impellers (blade diameter: 75 mm; blade width: 14 mm; pitch: 45 degrees), which impellers were placed at the height of 5 mm above the bottom of the separable flask.

The reaction vessel was charged with 207.1 g (165.7 ml) of 1,2-dichloroethane and 0.042 g (0.00026 mol) of 2,2'-azobis-methylisobutyrate, and the addition device was charged with a monomer solution (concentration of a monomer component: 36% by volume) wherein a monomer component consisting of 70 g (0.97 mol, 66.7 ml) of acrylic acid and 0.63 g (0.66 ml) of pentaerythritol allyl ether was dissolved in 148.1 g (118.5 ml) of 1,2-dichloroethane. The concentration of the monomer component in the total amount of the solvent charged in the reaction vessel and the monomer solution was 19% by volume.

Stirring of the content in the reaction vessel was started, and nitrogen gas was blown into the content, in order to remove oxygen present in the content and the upper space of the reaction vessel. Thereafter, heating was carried out in a state where inside of the reaction vessel was kept under nitrogen atmosphere, and the monomer solution was continuously added from the addition device, taking 110 minutes from the time when the temperature of the content of the reaction vessel reached 60° C. In this case, the reaction temperature was controlled so that the reaction temperature gradually increased to 75° C. During addition of the monomer solution, rotational speed of the stirrer was increased by 50 rpm per minute from the initial rotational speed of 200 rpm, until the reaction solution slurry of which viscosity gradually increased could be uniformly stirred. After completion of addition of the monomer solution, the temperature was kept at 75° C., and the reaction was allowed to continue (mature) for another 1 hour. Here, the conversion of the monomer component at the time of completion of addition of the monomer solution was 75%.

After completion of the reaction, the produced slurry was transferred to another vessel, and heated to 90° C. to distill 1,2-dichloroethane off, to give 68 g of alkyl-modified carboxyl group-containing water-soluble polymer in a form of a fine white powder.

Example 2

A reaction vessel similar to the reaction vessel used in Example 1 was prepared, and charged with a mixed solvent of 107.9 g (158.7 ml) of n-heptane and 35.7 g (39.7 ml) of ethyl acetate, and 0.036 g (0.00015 mol) of 2,2'-azobismethyl-isobutyrate. In addition, an addition device was charged with a monomer solution (concentration of a monomer component: 36% by volume) wherein a monomer component consisting of 60 g (0.83 mol, 57.1 ml) of acrylic acid and 0.33 g (0.35 ml) of pentaerythritol allyl ether was dissolved in a mixed solvent of 55.3 g (81.3 ml) of n-heptane and 18.3 g (20.3 ml) of ethyl acetate. The concentration of the monomer component in the total amount of the solvent charged in the reaction vessel and the monomer solution was 16% by volume.

Stirring of the content of the reaction vessel was started, and nitrogen gas was blown into the content, in order to remove oxygen present in the content and the upper space of the reaction vessel. Thereafter, heating was carried out in a state where inside of the reaction vessel was kept under nitrogen atmosphere, and the monomer solution was continuously added from the addition device, taking 180 minutes from the time when the temperature of the content of the reaction vessel reached 70° C. In this case, the reaction temperature was controlled so that the temperature gradually increased to 75° C. During addition of the monomer solution, rotational speed of the stirrer was increased by 50 rpm per minute from the initial rotational speed of 200 rpm, until the reaction solution slurry of which viscosity gradually increased could be uniformly stirred. After completion of addition of the monomer solution, the reaction temperature was kept at 75° C., and the reaction was allowed to continue (mature) for 1 hour. Here, the conversion of the monomer component at the time of completion of addition of the monomer solution was 78%.

After completion of the reaction, the produced slurry was transferred to another vessel, and heated to 110° C. to distill both n-heptane and ethyl acetate off, to give 57 g of alkyl-modified carboxyl group-containing water-soluble polymer in a form of a fine white powder.

Example 3

A reaction vessel similar to the reaction vessel used in Example 1 was prepared, and charged with a mixed solvent of 107.9 g (158.7 ml) of n-heptane and 35.7 g (39.7 ml) of ethyl acetate, and 0.036 g (0.00015 mol) of 2,2'-azobismethyl-isobutyrate. In addition, an addition device was charged with a monomer solution (concentration of a monomer component: 36% by volume) wherein a monomer component consisting of 60 g (0.83 mol, 57.1 ml) of acrylic acid and 0.33 g (0.35 ml) of pentaerythritol allyl ether was dissolved in a mixed solvent of 55.3 g (81.3 ml) of n-heptane and 18.3 g (20.3 ml) of ethyl acetate. The concentration of the monomer component in the total amount of the solvent charged in the reaction vessel and the monomer solution was 16% by volume.

Stirring of the content of the reaction vessel was started, and nitrogen gas was blown into the content, in order to remove oxygen present in the content and the upper space of the reaction vessel. Thereafter, keeping inside of the reaction vessel under nitrogen atmosphere, the monomer solution was continuously added from the addition device, taking 300 minutes. In this case, addition of the monomer solution was started when temperature of the content of the reaction vessel was ordinary temperature (25° C.), and the reaction temperature was controlled so that the reaction temperature gradually increased to 75° C. During addition of the monomer solution, rotational speed of the stirrer was increased by 50 rpm per minute from the initial rotational speed of 200 rpm, until the reaction solution slurry of which viscosity gradually increased could be uniformly stirred. After completion of addition of the monomer solution, the reaction was allowed to continue (mature) for 1 hour, with keeping the temperature at 75° C. Here, the conversion of the monomer component at the time of completion of addition of the monomer solution was 78%.

After completion of the reaction, the produced slurry was transferred to another vessel, and heated to 110° C. to distill both n-heptane and ethyl acetate off, to give 57 g of alkyl-modified carboxyl group-containing water-soluble polymer in a form of a fine white powder.

Example 4

Operations were carried out in the similar manner as in Example 2, except that a reaction vessel was charged with a mixed solvent of 54.9 g (80.7 ml) of n-heptane and 18.2 g (20.2 ml) of ethyl acetate, and 0.036 g (0.00015 mol) of 2,2'-azobismethylisobutyrate, and that an addition device was charged with a monomer solution (concentration of a monomer component: 36% by volume) wherein a monomer component consisting of 60 g (0.83 mol, 57.1 ml) of acrylic acid and 0.30 g (0.32 ml) of pentaerythritol allyl ether was dissolved in a mixed solvent of 55.3 g (81.3 ml) of n-heptane and 18.3 g (20.3 ml) of ethyl acetate (concentration of the monomer component in the total amount of the solvent charged in the reaction vessel and the monomer solution is 22% by volume) in Example 2, to give 57 g of alkyl-modified carboxyl group-containing water-soluble polymer in a form of a fine white powder. Here, the conversion of the monomer component at the time of completion of addition of the monomer solution was 81%.

Example 5

A reaction vessel similar to the reaction vessel used in Example 1 was prepared, and charged with a monomer component consisting of 24 g (0.33 mol, 22.9 ml) of acrylic acid and 0.10 g (0.11 ml) of pentaerythritol allyl ether, a mixed solvent of 111.4 g (163.8 ml) of n-heptane and 36.8 g (40.9 ml) of ethyl acetate, and 0.036 g (0.00015 mol) of 2,2'-azobismethylisobutyrate. In addition, an addition device was charged with a monomer solution (concentration of a monomer component: 36% by volume) wherein a monomer component consisting of 36 g (0.50 mol, 34.3 ml) of acrylic acid and 0.23 g (0.24 ml) of pentaerythritol allyl ether was dissolved in a mixed solvent of 51.8 g (76.2 ml) of n-heptane and 17.2 g (19.1 ml) of ethyl acetate. The concentration of the monomer component in the total amount of the solvent and the monomer component charged in the reaction vessel and the monomer solution was 16% by volume.

Stirring of the content in the reaction vessel was started, and nitrogen gas was blown into the content, in order to remove oxygen present in the content and the upper space of the reaction vessel. Thereafter, heating was carried out in a state where inside of the reaction vessel was kept under nitrogen atmosphere, and the monomer solution was continuously added from the addition device, taking 150 minutes from the time when the temperature of the content of the reaction vessel reached 60° C. In this case, the reaction temperature was controlled so that the reaction temperature gradually increased to 75° C. During addition of the monomer solution, rotational speed of the stirrer was increased by 50 rpm per minute from the initial rotational speed of 200 rpm, until the reaction solution slurry of which viscosity gradually increased could be uniformly stirred. After completion of addition of the monomer solution, the temperature was kept at 75° C., and the reaction was allowed to continue (mature) for 1 hour. Here, the conversion of the monomer component at the time of completion of addition of the monomer solution was 82%.

After completion of the reaction, the produced slurry was transferred to another vessel, and heated to 110° C. to distill both n-heptane and ethyl acetate off, to give 57 g of alkyl-modified carboxyl group-containing water-soluble polymer in a form of a fine white powder.

Example 6

Operations were carried out in the similar manner as in Example 2, except that the time period for continuous addition of a monomer solution was changed to 120 minutes, to give 57 g of alkyl-modified carboxyl group-containing water-soluble polymer in a form of a fine white powder. Here, the conversion of the monomer component at the time of completion of addition of the monomer solution was 62%.

Example 7

Operations were carried out in the similar manner as in Example 2, except that a reaction vessel was charged with a mixed solvent of 64.8 g (95.3 ml) of n-heptane and 21.4 g (23.8 ml) of ethyl acetate, and 0.036 g (0.00015 mol) of 2,2'-azobismethylisobutyrate, and that an addition device was charged with a monomer solution (concentration of a monomer component: 24% by volume) wherein a monomer component consisting of 60 g (0.83 mol, 57.1 ml) of acrylic acid and 0.33 g (0.35 ml) of pentaerythritol allyl ether was dissolved in a mixed solvent of 98.4 g (144.7 ml) of n-heptane and 32.6 g (36.2 ml) of ethyl acetate (concentration of the monomer component in the total amount of the solvent charged in the reaction vessel and the monomer solution is 16% by volume), to give 57 g of alkyl-modified carboxyl group-containing water-soluble polymer in a form of a fine white powder. Here, the conversion of the monomer component at the time of completion of addition of the monomer solution was 75%.

Example 8

Operations were carried out in the similar manner as in Example 2, except that an addition device was charged with a monomer solution (concentration of a monomer component: 37% by volume) wherein a monomer component consisting of 60 g (0.83 mol, 57.1 ml) of acrylic acid, 2.4 g (0.009 mol) of lauryl methacrylate and 0.33 g (0.35 ml) of pentaerythritol allyl ether was dissolved in a mixed solvent of 55.3 g (81.3 ml) of n-heptane and 18.3 g (20.3 ml) of ethyl acetate (concentration of the monomer component in the total amount of the solvent charged in the reaction vessel and the monomer solution is 17% by volume), to give 57 g of alkyl-modified carboxyl group-containing water-soluble polymer in a form of a fine white powder. Here, the conversion of the monomer component at the time of completion of addition of the monomer solution was 81%.

Example 9

Operations were carried out in the similar manner as in Example 2, except that an addition device was charged with a monomer solution (concentration of a monomer component: 37% by volume) wherein a monomer component consisting of 60 g (0.83 mol, 57.1 ml) of acrylic acid and 3.0 g (0.009 mol, 3.3 ml) of stearyl methacrylate was dissolved in a mixed solvent of 55.3 g (81.3 ml) of n-heptane and 18.3 g (20.3 ml) of ethyl acetate (concentration of the monomer component in the total amount of the solvent charged in the reaction vessel and the monomer solution is 17% by volume), to give 61 g of alkyl-modified carboxyl group-containing water-soluble polymer in a form of a fine white powder. Here, the conversion of the monomer component at the time of completion of addition of the monomer solution was 83%.

Comparative Example 1

A reaction vessel consisting of a 500 mL-volume round-bottom separable flask (spherical diameter: 110 mm) equipped with a stirrer, a thermometer, a nitrogen-blowing tube, and a condenser was prepared. The stirrer used here was similar to the stirrer used in Example 1. This reaction vessel was charged with 45 g (0.63 mol, 42.9 ml) of acrylic acid (monomer component), 392.9 g (314.3 ml) of 1,2-dichloroethane, 0.36 g (0.38 ml) of pentaerythritol allyl ether and 0.095 g (0.00004 mol) of 2,2'-azobismethylisobutyrate (concentration of the monomer component: 12% by volume). Thereafter, stirring of the content in the reaction vessel was started, and nitrogen gas was blown into the content, in order to remove oxygen present in the content and the upper space of the reaction vessel.

Next, heating was carried out in a state where inside of the reaction vessel was kept under nitrogen atmosphere, and reaction was carried out for 200 minutes with keeping the temperature at 75° C. During the reaction, rotational speed of the stirrer was increased by 50 rpm per minute from the initial rotational speed of 200 rpm, until the reaction solution slurry of which viscosity gradually increased could be uniformly stirred. Thereafter, 0.05 g (0.00022 mol) of 2,2'-azobismethylisobutyrate was further added, and the reaction was allowed to continue (mature) for another 1 hour, with keeping the temperature at 75° C.

After completion of the reaction, the produced slurry was transferred to another vessel, and heated to 90° C. to distill 1,2-dichloroethane off, to give 44 g of alkyl-modified carboxyl group-containing water-soluble polymer in a form of a fine white powder.

Comparative Example 2

A reaction vessel similar to the reaction vessel used in Comparative Example 1 was prepared, and charged with 45 g (0.63 mol, 42.9 ml) of acrylic acid (monomer component), a mixed solvent of, 0.27 g (0.28 ml) of pentaerythritol allyl ether, 160.3 g (235.7 ml) of n-heptane and 70.7 g (78.6 ml) of ethyl acetate, and 0.081 g (0.0035 mol) of 2,2'-azobismethylisobutyrate (concentration of the monomer component: 12% by volume). Thereafter, stirring of the content of the reaction vessel was started, and nitrogen gas was blown into the content, in order to remove oxygen present in the content and the upper space of the reaction vessel.

Next, heating was carried out in a state where inside of the reaction vessel was kept under nitrogen atmosphere, and reaction was carried out for 200 minutes with keeping the temperature at 75° C. During the reaction, rotational speed of the stirrer was increased by 50 rpm per minute from the initial rotational speed of 200 rpm, until the reaction solution slurry of which viscosity gradually increased could be uniformly stirred. Thereafter, the reaction was allowed to continue (mature) for another 1 hour, with keeping the temperature at 75° C.

After completion of the reaction, the produced slurry was transferred to another vessel, and heated to 100° C. to distill both n-heptane and ethyl acetate off, to give 43 g of alkyl-modified carboxyl group-containing water-soluble polymer in a form of a fine white powder.

Comparative Example 3

Operations were carried out in the similar manner as in Example 2, except that a reaction vessel was charged with a mixed solvent of 24.7 g (36.3 ml) of n-heptane and 8.2 g (9.1 ml) of ethyl acetate, and 0.036 g (0.00015 mol) of 2,2'-azobismethylisobutyrate, and that an addition device was charged with a monomer solution (concentration of a monomer component: 36% by volume) wherein a monomer component consisting of 60 g (0.83 mol, 57.1 ml) of acrylic acid and 0.30 g (0.32 ml) of pentaerythritol allyl ether was dissolved in a mixed solvent of 55.3 g (81.3 ml) of n-heptane and 18.3 g (20.3 ml) of ethyl acetate (concentration of the monomer component in the total amount of the solvent charged in the reaction vessel and the monomer solution is 28% by volume), to give 57 g of alkyl-modified carboxyl group-containing water-soluble polymer in a form of a fine white powder. Here, the conversion of the monomer component at the time of completion of addition of the monomer solution was 72%.

Comparative Example 4

A reaction vessel similar to the reaction vessel used in Example 1 was prepared, and charged with a monomer component consisting of 45 g (0.63 mol, 42.8 ml) of acrylic acid and 0.25 g (0.26 ml) of pentaerythritol allyl ether, a mixed solvent of 149.4 g (219.7 ml) of n-heptane and 49.4 g (54.9 ml) of ethyl acetate, and 0.036 g (0.00015 mol) of 2,2'-azobismethylisobutyrate. In addition, an addition device was charged with a monomer solution (concentration of a monomer component: 36% by volume) wherein a monomer component consisting of 15 g (0.21 mol, 14.3 ml) of acrylic acid and 0.08 g (0.08 ml) of pentaerythritol allyl ether was dissolved in a mixed solvent of 13.8 g (20.3 ml) of n-heptane and 4.6 g (5.1 ml) of ethyl acetate. The concentration of the monomer component in the total amount of the solvent charged in the reaction vessel and the monomer solution was 16% by volume.

Stirring of the content in the reaction vessel was started, and nitrogen gas was blown into the content, in order to remove oxygen present in the content and the upper space of the reaction vessel. Thereafter, heating was carried out in a state where inside of the reaction vessel was kept under nitrogen atmosphere, and the monomer solution was continuously added from the addition device, taking 150 minutes from the time when the temperature of the content in the reaction vessel reached 60° C. In this case, the reaction temperature was controlled so that the reaction temperature gradually increased to 75° C. During addition of the monomer solution, rotational speed of the stirrer was increased by 50 rpm per minute from the initial rotational speed of 200 rpm, until the reaction solution slurry of which viscosity gradually increased could be uniformly stirred. After completion of addition of the monomer solution, the reaction was allowed to continue (mature) for another 1 hour, with keeping the temperature at 75° C. Here, the conversion of the monomer component at the time of completion of addition of the monomer solution was 85%.

After completion of the reaction, the produced slurry was transferred to another vessel, and heated to 110° C. to distill both n-heptane and ethyl acetate off, to give 57 g of alkyl-modified carboxyl group-containing water-soluble polymer in a form of a fine white powder.

Comparative Example 5

Operations were carried out in the similar manner as in Example 2, except that the time period for continuous addition of a monomer solution was changed to 80 minutes, to give 57 g of alkyl-modified carboxyl group-containing water-soluble polymer in a form of a fine white powder. Here, the conversion of the monomer component at the time of completion of addition of the monomer solution was 55%.

Comparative Example 6

Operations were carried out in the similar manner as in Example 2, except that a reaction vessel was charged with a mixed solvent of 21.6 g (31.8 ml) of n-heptane and 7.1 g (7.9 ml) of ethyl acetate, and 0.036 g (0.00015 mol) of 2,2'-azobismethylisobutyrate, and that an addition device was charged with a monomer solution (concentration of a monomer component: 18% by volume) wherein a monomer component consisting of 60 g (0.83 mol, 57.1 ml) of acrylic acid and 0.33 g (0.35 ml) of pentaerythritol allyl ether was dissolved in a mixed solvent of 141.6 g (208.2 ml) of n-heptane and 46.9 g (52.1 ml) of ethyl acetate (concentration of the monomer component in the total amount of the solvent charged in the reaction vessel and the monomer solution is 16% by volume), to give 57 g of alkyl-modified carboxyl group-containing water-soluble polymer in a form of a fine white powder. Here, the conversion of the monomer component at the time of completion of addition of the monomer solution was 68%.

Comparative Example 7

Operations were carried out in the similar manner as in Example 2, except that a reaction vessel was charged with a mixed solvent of 137.8 g (202.6 ml) of n-heptane and 45.6 g (50.7 ml) of ethyl acetate, and 0.036 g (0.00015 mol) of 2,2'-azobismethylisobutyrate, and that an addition device was charged with a monomer solution (concentration of a monomer component: 55% by volume) wherein a monomer component consisting of 60 g (0.83 mol, 57.1 ml) of acrylic acid and 0.33 g (0.35 ml) of pentaerythritol allyl ether was dissolved in a mixed solvent of 25.4 g (37.4 ml) of n-heptane and 8.4 g (9.3 ml) of ethyl acetate (concentration of the monomer component in the total amount of the solvent charged in the reaction vessel and the monomer solution is 16% by volume), to give 57 g of alkyl-modified carboxyl group-containing water-soluble polymer in a form of a fine white powder. Here, the conversion of the monomer component at the time of completion of addition of the monomer solution was 80%.

Comparative Example 8

A reactor similar to the reactor used in Example 1 was prepared, and charged with a monomer component consisting of 45 g (0.63 mol, 42.9 ml) of acrylic acid, 1.8 g (0.007 mol, 2.1 ml) of lauryl methacrylate and 0.27 g (0.28 ml) of pentaerythritol allyl ether, a mixed solvent of 160.3 g (235.7 ml) of n-heptane and 70.7 g (78.6 ml) of ethyl acetate, and 0.081 g (0.0035 mol) of 2,2'-azobismethylisobutyrate. The concentration of the monomer component in the total amount of the solvent and the monomer component charged in the reaction vessel was 13% by volume.

Stirring of the content of the reaction vessel was started, and nitrogen gas was blown into the content, in order to remove oxygen present in the content and the upper space of the reaction vessel. Thereafter, heating was carried out in a state where inside of the reaction vessel was kept under nitrogen atmosphere, and reaction was carried out for 200 minutes, with keeping the temperature at 75° C. Rotational speed of the stirrer was increased by 50 rpm per minute from the initial rotational speed of 200 rpm, until the reaction solution slurry of which viscosity gradually increased could be uniformly stirred. After completion of the reaction, the reaction was allowed to continue (mature) for another 1 hour, with keeping the temperature at 75° C.

After completion of the reaction, the produced slurry was transferred to another vessel, and heated to 100° C. to distill both n-heptane and ethyl acetate off, to give 44 g of alkyl-modified carboxyl group-containing water-soluble polymer in a form of a fine white powder.

Comparative Example 9

A reaction vessel similar to the reaction vessel used in Comparative Example 1 was prepared, and charged with a monomer component consisting of 5 g (11% by weight relative to the total amount summed up with the acrylic acid to be added later, 4.8 ml) of acrylic acid and 0.03 g (0.03 ml) of pentaerythritol allyl ether, 0.017 g of α,α'-azobisisobutyronitrile and 210.8 g (314.6 ml) of n-hexane. The concentration of the monomer component in the total amount of the solvent and the monomer component charged in the reaction vessel was 16% by volume.

Stirring of the content of the reaction vessel was started, and nitrogen gas was blown into the content, in order to remove oxygen present in the content and the upper space of the reaction vessel. Thereafter, heating was carried out in a state where inside of the reaction vessel was kept under nitrogen atmosphere, and reaction was carried out for 1 hour, with keeping the temperature at 64 to 66° C. At this point, the conversion of the monomer component was 70%. Thereafter, 40 g (89% by weight relative to the total amount summed up with the acrylic acid previously charged in the reaction vessel, 38.2 ml), 0.24 g (0.25 ml) of pentaerythritol allyl ether, and 0.136 g of α,α'-azobisisobutyronitrile were charged thereto, and reaction was carried out for another 3 hours.

After completion of the reaction, the produced slurry was heated to 90° C. to distill n-hexane off, and drying under reduced pressure was carried out under the conditions of 110° C. and 10 mmHg for 8 hours, to give 41 g of cross-linked carboxyl group-containing polymer in a form of a fine white powder.

Comparative Example 10

A reaction vessel similar to the reaction vessel used in Comparative Example 1 was prepared, and charged with a monomer component consisting of 22.5 g (50% by weight relative to the total amount summed up with the acrylic acid to be added later, 21.4 ml) of acrylic acid and 0.135 g (0.14 ml) of pentaerythritol allyl ether, 0.077 g of α,α'-azobisisobutyronitrile and 210.8 g (314.6 ml) of n-hexane. The concentration of the monomer component in the total amount of the solvent and the monomer component charged in the reaction vessel was 12% by volume.

Stirring of the content of the reaction vessel was started, and nitrogen gas was blown into the content, in order to remove oxygen present in the content and the upper space of the reaction vessel. Thereafter, heating was carried out in a state where inside of the reaction vessel was kept under nitrogen atmosphere, and reaction was carried out for 2 hours, with keeping the temperature at 64 to 66° C. At this point, the conversion of the monomer component was 82%. Thereafter, 22.5 g (50% by weight relative to the total amount summed up with the acrylic acid previously charged in the reaction vessel, 21.4 ml), 0.135 g (0.14 ml) of pentaerythritol allyl ether, and 0.077 g of α,α'-azobisisobutyronitrile were charged thereto, and reaction was carried out for another 2 hours.

After completion of the reaction, the produced slurry was heated to 90° C. to distill n-hexane off, and drying under reduced pressure was carried out under the conditions of 110° C. and 10 mmHg for 8 hours, to give 41 g of cross-linked carboxyl group-containing polymer in a form of a fine white powder.

Comparative Example 11

A reaction vessel similar to the reaction vessel used in Comparative Example 1 was prepared, and charged with 40 g (0.56 mol, 38.1 ml) of acrylic acid, 0.2 g (0.0008 mol) of lauryl methacrylate, 0.08 g of sodium carbonate, 0.25 g (0.26 ml) of pentaerythritol allyl ether, 0.16 g (0.001 mol) of α,α'-azobisisobutyronitrile, and 177.0 g (264.2 ml) of n-hexane.

Stirring of the content of the reaction vessel was started, and nitrogen gas was blown into the content, in order to remove oxygen present in the content and the upper space of the reaction vessel. Thereafter, heating was carried out in a state where inside of the reaction vessel was kept under nitrogen atmosphere, and reaction was carried out for 60 minutes, with keeping the temperature at 60 to 65° C. At this point, the total amount of unreacted acrylic acid and lauryl methacrylate in the reaction solution was 0.215 mol, which was 38 mol % relative to the total amount of the acrylic acid and the lauryl methacrylate charged in the reaction vessel.

Successively, 10 g (0.14 mol, 9.5 ml) of acrylic acid was added to the reaction solution, and reaction was carried out for 180 minutes, with keeping the temperature at the above-mentioned temperature. During the reaction, rotational speed of the stirrer was increased by 50 rpm per minute from the initial rotational speed of 200 rpm, until the reaction solution slurry of which viscosity gradually increased could be uniformly stirred.

After completion of the reaction, the produced slurry was transferred to another vessel and heated to 90° C. to distill n-hexane off, to give 48 g of alkyl-modified carboxyl group-containing water-soluble polymer in a form of a fine white powder.

Comparative Example 12

A reaction vessel similar to the reaction vessel used in Comparative Example 1 was prepared, and charged with 40 g (0.56 mol, 38.1 ml) of acrylic acid, 0.08 g of potassium carbonate, 0.48 g of diethylene glycol diallyl ether, 0.16 g (0.001 mol) of α,α'-azobisisobutyronitrile, and 177.0 g (264.2 ml) of n-hexane.

Stirring of the content of the reaction vessel was started, and nitrogen gas was blown into the content, in order to remove oxygen present in the content and the upper space of the reaction vessel. Thereafter, heating was carried out in a state where inside of the reaction vessel was kept under nitrogen atmosphere, and reaction was carried out for 90 minutes, with keeping the temperature at 60 to 65° C. At this point, the amount of unreacted acrylic acid in the reaction liquid was 0.170 mol, which was 30 mol % relative to the acrylic acid charged in the reaction vessel.

Successively, 10 g (0.14 mol, 9.5 ml) of acrylic acid was added to the reaction solution, and reaction was carried out for 150 minutes, with keeping the temperature at the above-mentioned temperature. During the reaction, rotational speed of the stirrer was increased by 50 rpm per minute from the initial rotational speed of 200 rpm, until the reaction solution slurry of which viscosity gradually increased could be uniformly stirred.

After completion of the reaction, the produced slurry was transferred to another vessel and heated to 90° C. to distill n-hexane off, to give 48 g of alkyl-modified carboxyl group-containing water-soluble polymer in a form of a fine white powder.

Evaluation 1

Regarding Examples 1 to 9 and Comparative Examples 1 to 12, conditions of the reaction solution slurry during polymerization reaction were evaluated. Here, viscosity of the reaction solution slurry during polymerization and adhesion state of the polymerization products to the reaction vessel were evaluated by the method described below. Results are shown in Tables 1 and 2.

(Viscosity of Reaction Solution Slurry)

Level of viscosity of the reaction solution slurry was evaluated by the number of rotations of the impeller (final number of rotations after acceleration) required for stirring the reaction solution slurry uniformly during polymerization by a stirrer. When the number of rotations is more than 600 rpm, viscosity of the reaction solution slurry is high, and it is difficult to control heat of reaction during polymerization reaction and there is a risk of causing bumping of the reaction solution.

(Adhesion State of Polymerization Product to Reaction Vessel)

Adhesion state of the polymerization product in Comparative Example 2 to the reaction vessel was evaluated as scale 5, and the adhered amount in visual comparison with the polymerization product in Comparative Example 2 was evaluated on 5-point scale of 1 to 5. When the number of the scale is small, it is meant that adhesion to the reaction vessel is small.

Evaluation 2

Regarding the carboxyl group-containing water-soluble polymer powders obtained in Examples 1 to 9 and Comparative Examples 1 to 12, bulk specific gravity, existence or non-existence of water-insoluble matter, and viscosity of a 0.5% by weight aqueous solution were examined by the following methods. Results are shown in Tables 1 and 2.

(Bulk Specific Gravity)

Bulk specific gravity refers to the ratio of weight and volume of the produced carboxyl group-containing water-soluble polymer powder. Specifically, 10 g of carboxyl group-containing water-soluble polymer powder was poured into an empty 50 ml-volume measuring cylinder from a height of 5 cm above the measuring cylinder within 20 seconds, and the volume (ml) for which the carboxyl group-containing water-soluble polymer powder accounts was determined. Thereafter, bulk specific gravity (g/ml) was calculated by dividing the weight of the loaded carboxyl group-containing water-soluble polymer powder (10 g) by the determined volume (ml).

(Existence or Non-Existence of Water-Insoluble Matter)

In a 2,000 ml-beaker was put 1,000 g of ion-exchanged water, and 20 g of carboxyl group-containing water-soluble polymer was added thereto, with stirring the mixture with DISPER (trade name "T. K. ROBOMIX" from PRIMIX Corporation to which dispersion blades were attached) at 5,000 rpm. After 30 minutes of stirring, suction filtration was carried out with a 250-mesh filter cloth of which weight is known, and the water on the filter cloth was sufficiently removed by drying the filter cloth at 110° C. for 3 hours, to determine the weight. Rate of water-insoluble matter was calculated according to the following formula. Here, when the rate of the water-insoluble matter was 0.03% or less, it was judged that there was no water-insoluble matter.

[Formula 2]

$$\text{Water-insoluble matter (\%)} = \frac{\text{Weight of filter cloth after filtration} - \text{Weight of filter cloth before filtration}}{20} \times 100$$

(Viscosity of 0.5% by Weight Aqueous Solution)

Into a beaker of which volume was 500 ml was put 298.5 g of ion-exchanged water, and 1.5 g of carboxyl group-containing water-soluble polymer was collectively added thereto, with stirring the mixture using a stirrer equipped with a 4-blade paddle (blade diameter: 50 mm) at a rotational speed of 300 rpm. Dissolution of the carboxyl group-containing water-soluble polymer was visually confirmed, and the resulting 0.5% by weight aqueous solution was neutralized to pH 7 with sodium hydroxide, to give a neutralized viscous liquid. Viscosity of this neutralized viscous liquid was determined with a B-type viscometer at 25° C. and 20 rpm. According to Table 1, the carboxyl group-containing water-soluble polymers obtained in Examples 1 to 8 are effective as a thickener, due to high viscosity.

TABLE 1

| | Example | | | | | | | | |
|---|---|---|---|---|---|---|---|---|---|
| | 1 | 2 | 3 | 4 | 5 | 6 | 7 | 8 | 9 |
| Rate of charge of monomer component to reaction vessel (%) | 0 | 0 | 0 | 0 | 40 | 0 | 0 | 0 | 0 |

TABLE 1-continued

| | Example | | | | | | | | |
|---|---|---|---|---|---|---|---|---|---|
| | 1 | 2 | 3 | 4 | 5 | 6 | 7 | 8 | 9 |
| Rate of addition of monomer component to reaction vessel (%) | 100 (continuous addition) | 100 (continuous addition) | 100 (continuous addition) | 100 (continuous addition) | 60 (continuous addition) | 100 (continuous addition) | 100 (continuous addition) | 100 (continuous addition) | 100 (continuous addition) |
| Monomer component | AA + PEA | AA + PEA | AA + PEA | AA + PEA | AA + PEA | AA + PEA | AA + PEA | AA + PEA + LM | AA + SM |
| Inert solvent | EDC | HEP + EA | HEP + EA | HEP + EA | HEP + EA | HEP + EA | HEP + EA | HEP + EA | HEP + EA |
| Concentration of monomer solution (% by volume) | 36 | 36 | 36 | 36 | 36 | 36 | 24 | 37 | 37 |
| Concentration of monomer component (% by volume) | 19 | 16 | 16 | 22 | 16 | 16 | 16 | 17 | 17 |
| Conversion at the time of completion of addition of monomer solution (%) | 75 | 78 | 78 | 81 | 82 | 62 | 75 | 81 | 83 |
| Viscosity of reaction solution slurry (rpm) | 350 | 400 | 350 | 300 | 500 | 450 | 300 | 300 | 300 |
| Adhesion state to reaction vessel | 1 | 1 | 1 | 1 | 2 | 1 | 1 | 1 | 1 |
| Bulk specific gravity (g/ml) | 0.24 | 0.22 | 0.22 | 0.25 | 0.20 | 0.21 | 0.24 | 0.22 | 0.24 |
| Water-insoluble matter | non-existent | non-existent | non-existent | non-existent | non-existent | non-existent | non-existent | non-existent | non-existent |
| Viscosity of 0.5% by weight aqueous solution | 46000 | 47000 | 48000 | 45000 | 44000 | 43000 | 44000 | 47000 | <1000 |

TABLE 2

| | Comparative Example | | | | | |
|---|---|---|---|---|---|---|
| | 1 | 2 | 3 | 4 | 5 | 6 |
| Rate of charge of monomer component to reaction vessel (%) | 100 | 100 | 0 | 75 | 0 | 0 |
| Rate of addition of monomer component to reaction vessel (%) | 0 | 0 | 100 (continuous addition) | 25 (continuous addition) | 100 (continuous addition) | 100 (continuous addition) |
| Monomer component | AA + PEA | AA + PEA | AA + PEA | AA + PEA | AA + PEA | AA + PEA |
| Inert solvent | HEP + EA | HEP + EA | HEP + EA | HEP + EA | HEP + EA | HEP + EA |
| Concentration of monomer solution (% by volume) | — | — | 36 | 36 | 36 | 18 |
| Concentration of monomer component (% by volume) | 12 | 12 | 28 | 16 | 16 | 16 |
| Conversion at the time of completion of addition of monomer solution (%) | — | — | 72 | 85 | 55 | 68 |
| Viscosity of reaction solution slurry (rpm) | >600 | >600 | >600 | >600 | >600 | >600 |
| Adhesion state to reaction vessel | 4 | 5 | 4 | 4 | 4 | 4 |
| Bulk specific gravity (g/ml) | 0.16 | 0.14 | 0.19 | 0.18 | 0.18 | 0.17 |
| Water-insoluble matter | non-existent | non-existent | existent | non-existent | non-existent | non-existent |
| Viscosity of 0.5% by weight aqueous solution | 45000 | 44000 | 52000 | 48000 | 38000 | 40000 |

TABLE 2-continued

| | Comparative Example | | | | | |
|---|---|---|---|---|---|---|
| | 7 | 8 | 9 | 10 | 11 | 12 |
| Rate of charge of monomer component to reaction vessel (%) | 0 | 100 | 11 | 50 | 80 | 80 |
| Rate of addition of monomer component to reaction vessel (%) | 100 (continuous addition) | 0 | 89 (collective addition) | 50 (collective addition) | 20 (collective addition) | 20 (collective addition) |
| Monomer component | AA + PEA | AA + PEA + LM | AA + PEA | AA + PEA | AA + PEA + LM | AA + DEDA |
| Inert solvent | HEP + EA | HEP + EA | HEX | HEX | HEX | HEX |
| Concentration of monomer solution (% by volume) | 55 | — | — | — | — | — |
| Concentration of monomer component (% by volume) | 16 | 13 | 12 | 12 | 15 | 15 |
| Conversion at the time of completion of addition of monomer solution (%) | 80 | — | — | — | — | — |
| Viscosity of reaction solution slurry (rpm) | >600 | >600 | >600 | >600 | >600 | >600 |
| Adhesion state to reaction vessel | 4 | 4 | 5 | 4 | 5 | 5 |
| Bulk specific gravity (g/ml) | 0.18 | 0.13 | 0.12 | 0.14 | 0.13 | 0.13 |
| Water-insoluble matter | existent | non-existent | non-existent | non-existent | non-existent | non-existent |
| Viscosity of 0.5% by weight aqueous solution | 46000 | 45000 | 40000 | 41000 | 48000 | 48000 |

The abbreviations shown in Tables 1 and 2 are as follows.
AA: acrylic acid
LM: lauryl methacrylate
SM: stearyl methacrylate
PEA: pentaerythritol allyl ether
DEDA: diethylene glycol diallyl ether
EDC: 1,2-dichloroethane
HEP: n-heptane
EA: ethyl acetate
HEX: n-hexane The present invention can be carried out in other specific forms without departing from the spirit or essential properties thereof. The above embodiment and example are therefore to be considered in all respects as illustrative and not restrictive. The scope of the present invention is indicated by the appended claims rather than by the foregoing description. All changes and modifications which come within the range of equivalency of the claims are therefore intended to be included within the scope of the present invention.

The invention claimed is:

1. A method for manufacturing a carboxyl group-containing water-soluble polymer by carrying out in an inert solvent a reaction of a monomer component containing an α,β-unsaturated carboxylic acid and a polymerizable compound having two or more ethylenically unsaturated groups of at least one kind selected from the group consisting of pentaerythritol allyl ether, polyallyl saccharose, diethylene glycol diallyl ether and polyethylene glycol diallyl ether, comprising:

step (A) of preparing a reaction vessel in which an inert solvent is charged, and step (B) of continuously adding a monomer solution wherein the monomer component is dissolved in an inert solvent at a concentration of 20 to 50% by volume to the inert solvent charged in the reaction vessel, wherein, the amount of the inert solvent charged in the reaction vessel in step (A) is set so that the concentration of the monomer component in the total amount summed up with the monomer solution is 10 to 24% by volume, and the time period until completion of continuous addition of the total amount of the monomer solution in step (B) is set so that the conversion of the monomer component is 60% or more at the time of completion of addition of the total amount of the monomer solution.

2. The method for manufacturing a carboxyl group-containing water-soluble polymer according to claim 1, further comprising step (C) of continuing the reaction after completion of continuous addition of the total amount of the monomer solution.

3. The method for manufacturing a carboxyl group-containing water-soluble polymer according to claim 2, further comprising step (D) of volatilizing the inert solvent from the reaction solution after completion of the reaction in step (C), to remove the inert solvent.

4. The method for manufacturing a carboxyl group-containing water-soluble polymer according to claim 1, wherein the α,β-unsaturated carboxylic acid is at least one kind selected from the group consisting of acrylic acid; methacrylic acid; an ester of acrylic acid and a higher alcohol of which alkyl group has a carbon number of 10 to 30; and an ester of methacrylic acid and a higher alcohol of which alkyl group has a carbon number of 10 to 30.

5. The method for manufacturing a carboxyl group-containing water-soluble polymer according to claim 1, wherein the inert solvent charged in the reaction vessel and the inert solvent in which the monomer component is dissolved in the monomer solution are the same.

6. The method for manufacturing a carboxyl group-containing water-soluble polymer according to claim 1, wherein less than 50% by weight of the total amount of the monomer component is previously dissolved in the inert solvent to be charged in the reaction vessel in step (A).

7. The method for manufacturing a carboxyl group-containing water-soluble polymer according to claim 1, wherein the usage of the polymerizable compound having two or more ethylenically unsaturated groups is set at 2 parts by weight or less, relative to 100 parts by weight of the $\alpha,\beta$-unsaturated carboxylic acid.

* * * * *